May 20, 1952     D. M. MacKENZIE     2,597,351
CLOTHESLINE CONNECTOR AND TIGHTENER

Filed April 6, 1949     2 SHEETS—SHEET 1

INVENTOR
Douglas Malcolm MacKenzie
George Riches

ATTORNEY

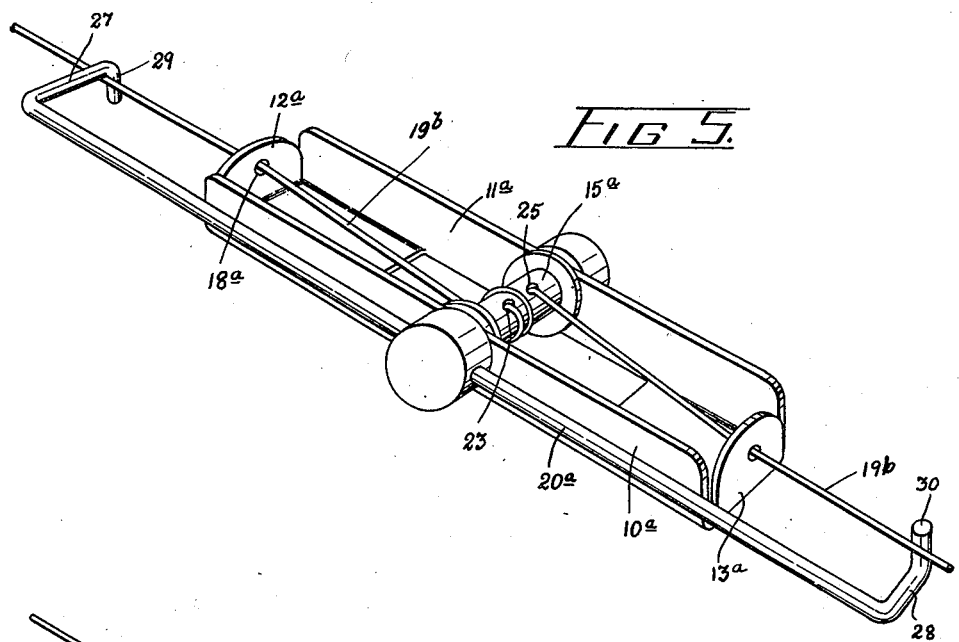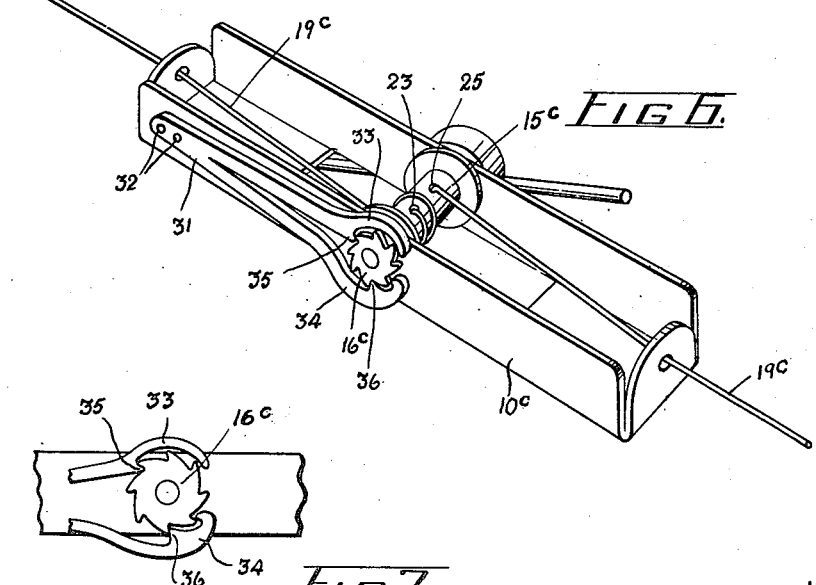

Patented May 20, 1952

2,597,351

UNITED STATES PATENT OFFICE 2,597,351

CLOTHESLINE CONNECTOR AND TIGHTENER

Douglas Malcolm MacKenzie, Toronto, Ontario, Canada

Application April 6, 1949, Serial No. 85,817
In Canada April 15, 1948

2 Claims. (Cl. 24—71.2)

This invention relates to a line connector and tightener for use with lines such as clothes lines, guy wires, brace wires, cables and all types of wires which require splicing and/or tightening.

Heretofore, in setting up a clothes line, for example of the endless type extended over and between two pulleys, it has been customary to connect the ends of such line by twisting the ends of the line together. The line is then tightened by the use of a turnbuckle which is used to connect one of the pulleys to one of the posts between which the line is suspended.

An object of this invention is to provide a combination line connector and tightener which is designed to connect the ends of the line and to incorporate a means for tightening the line. When used with a clothes line, or any other type of cable which runs on pulleys, the device also serves as a stop since it will not pass around the pulleys which carry the line.

The line connector and tightener of the present invention comprises, in general, a frame having spaced side walls, a rotatable shaft extending transversely between and supported by said side walls with at least one end extended exterior of the frame, said shaft having at least one opening adapted to receive an end of a line to be connected thereto and positioned between said walls, a handle member for rotating said shaft carried by an end of said shaft exterior of said side walls, the main portion of said handle member normally lying, in non-operative position, parallel to and extending beyond the ends of said frame, the ends of said handle member being turned at right angles to extend generally parallel to the ends of the frame to overlie or underlie a line extending to said shaft, and means carried by said inturned ends adapted to retain them in place in engagement with the line.

The specification and drawings describe and illustrate the preferred construction of my invention when employed as a clothes line connector. It is to be understood that the same is by way of illustration only as the connector can be used for the purpose of connecting and/or tightening any types of cable, etc., as above described.

In the drawings:

Figure 5 is a perspective view of a modification of the invention illustrated in Figures 1 to 4 inclusive;

Figure 6 is another modified form of the line tightener shown in Figures 1 to 4 inclusive; and Figure 7 is a fragmentary view of the locking device shown in Figure 6.

Like characters of reference refer to like parts throughout the specification and drawings.

Figure 1:
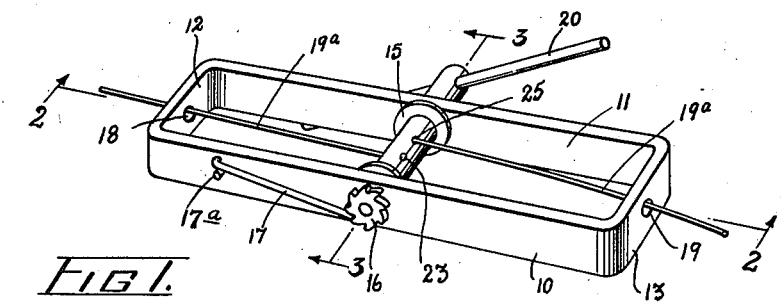
Figure 1 is a perspective view of one form of my invention.

The line tightener and connector illustrated in the drawings comprises a rectangular frame formed by a pair of parallel side walls 10, 11 and a pair of end walls 12, 13; a shaft 14, a spool 15; a ratchet wheel 16 and a fixed spring pawl 17.

The side members 10, 11 are substantially longer than the end members 12, 13 so that the frame has the shape of an elongated rectangle. The ends 12, 13 are formed with holes 18, 19 respectively through which the ends of the clothes line are passed.

The shaft 14 is rotatably supported by the side members 10, 11 substantially midway between the ends thereof. The ends of shaft 14 extend beyond the sides 10, 11, one end being provided with a hole through which there can be removably entered a handle member 20 by which the shaft 14 can be rotated. The other projecting end of the shaft 14 has secured thereto a ratchet wheel 16. Mounted on the side wall 10 is a spring pawl 17 which engages with the ratchet wheel 16. A stop 17a is provided to hold the pawl in position. The pawl 17 locks the ratchet wheel and shaft against rotation in one direction and permits the shaft to be rotated in the opposite direction to tighten the clothes line 19a.

In the first form of construction, the shaft 14 is formed with two holes 21, 22 which are drilled through the shaft at right angles to the axis of rotation. The spool 15 is provided with holes 23, 24, 25 and 26. The holes 23, 24 are diametrically opposite each other and respectively register with opposite ends of the hole 21 and the holes 25, 26 are positioned diametrically opposite each other and respectively register with opopsite ends of the hole 22.

The device is employed in the following manner. One end of the clothes line is passed through the hole 18 and then entered through the holes 23, 21 and 24. The other end of the line is passed through the hole 19 and through the holes 25, 22 and 26. The line is pulled as taut as possible by hand. The necessary tension is then applied to the line by rotating the shaft 14 by means of the lever 20. As soon as the shaft 14 starts to rotate, the spool 15 turns in the opposite direction and applies a gripping action to the end of the clothes line to lock the ends of the line in the holes 21, 22 respectively. The ends of the line can be cut off close to the spool as the locking action is such that it increases as the tension of the line is increased and it is not dependent on any of the line being wound on the spool. To detach the clothes line connector, it is only necessary to disengage the spring pawl 17 from the ratchet wheel 16 and rotate the shaft 14 in the reverse direction by means of the lever 20, until the ends of the line are unwound from the cylinder so that they can be removed from the holes.

Figure 2:
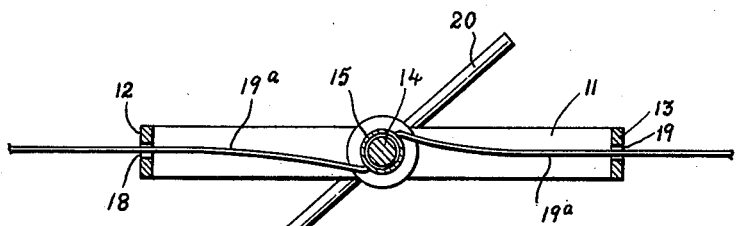
Figure 2 is a cross sectional view of my invention on the line 2—2 of Figure 1.
Figure 3:
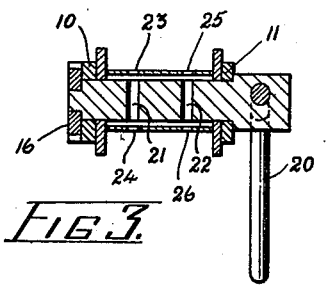
Figure 3 is a cross sectional view on the line 3—3 of Figure 1.
Figure 4:
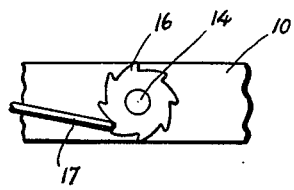
Figure 4 is a fragmentary view illustrating the locking device.

In the modification of the clothes line tightener illustrated in Figure 5, the ratchet wheel and fixed spring pawl illustrated in Figures 1, 2, 3 and 4 as elements 16 and 17 have been omitted and are replaced by the following means for locking the spool, 15a on which the line 19b is wound, against rotation.

The locking means illustrated in this Figure 5 consists of an extension of the handle member 20a which extends beyond the ends of the frame, defined by the side and end members 10a, 11a, 12a, and 13a respectively, at right angles towards the line 19b to form, respectively, arms 27 and 28. The free end of the arm 27 is bent downwardly to form a hook 29 and the free end of the arm 28 is bent upwardly to form a hook 30. When the line has been connected by threading the line through the holes 18a and tightened in the manner described hereinbefore, the spool 15a can be locked against rotation by placing the line 19b under the arm 27 and in engagement with the hook 29 and over the arm 28 and in engagement with the hook 30.

In the modification of the invention illustrated in Figures 6 and 7, the means for locking the spool 15c against rotation, and thus hold the line 19c in a tensioned condition, consists of the ratchet wheel 16c and a spring 31 which is secured to the wall 10c at one end by rivets 32. The spring 31 is bifurcated and terminates in a pair of jaws 33, 34 which embrace the sprocket or ratchet wheel 16c. The jaws 33, 34 are provided with teeth 35 and 36 respectively which engage with the teeth of the ratchet wheel and thus prevent the spool 15c from rotating in one direction. To allow the spool to unwind and thus remove the tension from the line 19c, the jaws 33 and 34 are spread by means of any suitable tool inserted between the arms of the spring 31.

What I claim as new and desire to protect by Letters Patent of the United States is:

1. A line connector and tightener which comprises a frame having spaced side walls, a rotatable shaft extending transversely between and supported by said side walls with at least one end extending exterior of the frame, said shaft having at least one opening adapted to receive an end of a line connected thereto and positioned between said walls, an opening through the end of the shaft adapted to receive an operating handle member, an operating handle member for rotating said shaft extended through and rotatable in said last mentioned opening, the main portion of said handle member normally lying, in non-operative position, parallel to and extending beyond the ends of said frame, the ends of said handle member being turned at right angles to extend generally parallel to the ends of the frame to overlie and underlie a line extending to said shaft, one of the free ends of said handle member being turned downwardly and the other upwardly for engagement with the adjacent line.

2. A line connector and tightener which comprises a frame having spaced side walls, a rotatable shaft extending transversely between and supported by said side walls with at least one end extending exterior of the frame, said shaft having at least one opening adapted to receive an end of a line connected thereto and positioned between said walls, an opening through the end of the shaft adapted to receive an operating handle member, an operating handle member for rotating said shaft extended through and rotatable in said last mentioned opening, the main portion of said handle member normally lying, in non-operative position, parallel to and extending beyond the ends of said frame, the ends of said handle member being turned at right angles to extend generally parallel to the ends of the frame to overlie and underlie a line extending to said shaft, the free ends of said handle member having projections thereon for engagement with the adjacent line.

DOUGLAS MALCOLM MacKENZIE.

REFERENCES CITED

The following references are of record in the file of this patent:

UNITED STATES PATENTS

| Number | Name | Date |
| --- | --- | --- |
| 562,558 | Terry | June 23, 1896 |
| 568,056 | Vail | Sept. 22, 1896 |
| 604,302 | Clark | May 17, 1898 |
| 658,149 | Jacobs | Sept. 18, 1900 |
| 810,795 | McPherson | Jan. 23, 1906 |
| 1,272,944 | Green | July 16, 1918 |
| 1,292,867 | Penning | Jan. 28, 1919 |
| 1,659,602 | Jensen | Feb. 1, 1928 |
| 2,065,577 | Gladstone | Dec. 29, 1936 |